United States Patent
Siddiqui et al.

(10) Patent No.: US 11,710,282 B2
(45) Date of Patent: Jul. 25, 2023

(54) AUGMENTED REALITY CONTENT RENDERING VIA ALBEDO MODELS, SYSTEMS AND METHODS

(71) Applicant: Nant Holdings IP, LLC, Culver City, CA (US)

(72) Inventors: Matheen Siddiqui, Culver City, CA (US); Kamil Wnuk, Playa del Rey, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

(21) Appl. No.: 17/505,576

(22) Filed: Oct. 19, 2021

(65) Prior Publication Data

US 2022/0036661 A1 Feb. 3, 2022

Related U.S. Application Data

(60) Continuation of application No. 16/883,966, filed on May 26, 2020, now Pat. No. 11,176,754, which is a
(Continued)

(51) Int. Cl.
*G06T 19/00* (2011.01)
*G06T 17/20* (2006.01)
(Continued)

(52) U.S. Cl.
CPC .............. *G06T 19/006* (2013.01); *G06T 7/20* (2013.01); *G06T 7/73* (2017.01); *G06T 15/50* (2013.01);
(Continued)

(58) Field of Classification Search
None
See application file for complete search history.

(56) References Cited

U.S. PATENT DOCUMENTS 6,298,148 B1 10/2001 Cline et al.
6,546,309 B1 4/2003 Gazzuolo
(Continued)

FOREIGN PATENT DOCUMENTS

CN 102426695 A 4/2012
CN 102568026 A 7/2012
(Continued)

OTHER PUBLICATIONS

Office Action issued in Chinese Patent Application No. 2015800380018 dated Oct. 8, 2018, 6 pages.
Boom et al., "Point Light Source Estimation based on Scenes Recorded by a RGB-D camera," British Machine Vision Conference 2013, 11 pages.
International Search Report and Written Opinion issued in International Application No. PCT/US2015/030675 dated Aug. 19, 2015, 15 pages.
(Continued)

*Primary Examiner* — Ryan M Gray
(74) *Attorney, Agent, or Firm* — Mauriel Kapoutian Woods LLP; Andrew A. Noble

(57) ABSTRACT

Methods for rendering augmented reality (AR) content are presented. An a priori defined 3D albedo model of an object is leveraged to adjust AR content so that is appears as a natural part of a scene. Disclosed devices recognize a known object having a corresponding albedo model. The devices compare the observed object to the known albedo model to determine a content transformation referred to as an estimated shading (environmental shading) model. The transformation is then applied to the AR content to generate adjusted content, which is then rendered and presented for consumption by a user.

35 Claims, 8 Drawing Sheets

Related U.S. Application Data division of application No. 16/259,774, filed on Jan. 28, 2019, now Pat. No. 10,685,498, application No. 17/505,576, filed on Oct. 19, 2021 is a continuation of application No. 15/707,815, filed on Sep. 18, 2017, now Pat. No. 10,192,365, which is a continuation of application No. 14/711,763, filed on May 13, 2015, now Pat. No. 9,805,510.

(60) Provisional application No. 61/992,804, filed on May 13, 2014.

(51) Int. Cl.
| | |
|---|---|
| *G06T 7/20* | (2017.01) |
| *G06T 15/50* | (2011.01) |
| *G06T 7/73* | (2017.01) |
| *G06T 15/80* | (2011.01) |

(52) U.S. Cl.
CPC .............. *G06T 15/80* (2013.01); *G06T 17/20* (2013.01); *G06T 2200/04* (2013.01); *G06T 2207/20081* (2013.01); *G06T 2215/16* (2013.01)

(56) References Cited

U.S. PATENT DOCUMENTS

| | | | |
|---|---|---|---|
| 6,697,518 | B2 | 2/2004 | Belhumeur et al. |
| 6,711,293 | B1 | 3/2004 | Lowe |
| 7,016,532 | B2 | 3/2006 | Boncyk et al. |
| 7,262,770 | B2 | 8/2007 | Sloan et al. |
| 7,324,688 | B2 * | 1/2008 | Moghaddam ........ G06V 40/169 382/285 |
| 7,688,363 | B2 | 3/2010 | Sato et al. |
| 7,893,971 | B2 | 2/2011 | Sato et al. |
| 8,090,160 | B2 | 1/2012 | Kakadiaris et al. |
| 8,463,073 | B2 | 6/2013 | Ma et al. |
| 8,538,144 | B2 | 9/2013 | Benitez et al. |
| 8,872,853 | B2 | 10/2014 | Sugden et al. |
| 8,878,900 | B2 | 11/2014 | Yang et al. |
| 9,524,585 | B2 | 12/2016 | Steed et al. |
| 9,710,958 | B2 | 7/2017 | Ha et al. |
| 9,805,510 | B2 | 10/2017 | Siddiqui et al. |
| 10,192,365 | B2 | 1/2019 | Siddiqui et al. |
| 10,685,498 | B2 | 6/2020 | Siddiqui et al. |
| 11,176,754 | B2 | 11/2021 | Siddiqui et al. |
| 2008/0030499 | A1 | 2/2008 | Wanda et al. |
| 2009/0052767 | A1 | 2/2009 | Bhalerao et al. |
| 2010/0289878 | A1 | 11/2010 | Sato et al. |
| 2012/0057032 | A1 | 3/2012 | Jang et al. |
| 2013/0002698 | A1 | 1/2013 | Geiger et al. |
| 2013/0121531 | A1 | 5/2013 | Lefevre et al. |
| 2014/0063017 | A1 | 3/2014 | Kaula et al. |
| 2014/0085625 | A1 | 3/2014 | Ahmed et al. |

FOREIGN PATENT DOCUMENTS

| | | |
|---|---|---|
| CN | 102696057 A | 9/2012 |
| JP | 2001084362 A | 3/2001 |
| JP | 2007156561 A | 6/2007 |
| JP | 2008040832 A | 2/2008 |
| JP | 4435867 B2 | 3/2010 |
| JP | 2010517129 A | 5/2010 |
| JP | 2010128986 A | 6/2010 |
| JP | 2010532035 A | 9/2010 |
| JP | 2011170391 A | 9/2011 |
| JP | 2013517579 A | 5/2013 |
| KR | 20110107545 A | 10/2011 |
| WO | 02/41249 A2 | 5/2002 |
| WO | 2006/085629 A2 | 8/2006 |
| WO | 2013/036233 A1 | 3/2013 |

OTHER PUBLICATIONS

Frahm et al., "Markerless Augmented Reality with Light Source Estimation for Direct Illumination," 2nd IEE European Conference on Visual Media Production, 2005, 10 pages.

Barron et al., "Color Constancy, Intrinsic Images and Shape Estimation," European Conference on Computer Vision, 2012, 14 pages.

Lee et al., "Estimation of Intrinsic Image Sequences from Image+ Depth Video," European Conference on Computer Vision, 2012, 14 pages.

Yu et al., "Shading-based Shape Refinement of RGB-D Images," Proceedings of the IEEE Conference on Computer Vision and Pattern Recognition, 2013, 8 pages.

Kanbara et al., "Real-time Estimation of Light Source Environment for Photorealistic Augmented Reality," 17th International Conference on Pattern Recognition, 2004, 4 pages.

Belhumeur et al., "What is the Set of Images of an Object under All Possible Illumination Conditions?" International Journal of Computer Vision, 1998, vol. 28, Issue 3, 16 pages.

Supan et al., "Interactive Image Based Lighting in Augmented Reality," Central European Seminar on Computer Graphics, 2006, vol. 17, 8 pages.

Chen et al., "A Simple Model for Intrinsic Image Decomposition with Depth Cues," 2013 IEEE International Conference on Computer Vision (ICCV), 8 pages.

Ramamoorthi et al., "An Efficient Representation for Irradiance Environment Maps," Proceedings of the 28th Annual Conference on Computer Graphics and Interactive Techniques, 4 pages.

Biswas et al., "Robust Estimation of Albedo for Illumination-invariant Matching and Shape Recovery," IEEE Transactions on Pattern Analysis and Machine Intelligence, 2009, vol. 31, Issue 5, 8 pages.

Taheri et al., "Joint Albedo Estimation and Pose Tracking from Video," IEEE transactions on pattern analysis and machine intelligence, 2013, vol. 35, Issue 7, 17 pages.

Jensen et al., "Real-Time Image Based Lighting for Outdoor Augmented Reality Under Dynamically Changing Illumination Conditions," Proceedings of the First international Conference on Computer Graphics Theory and Applications, GRAPP 2006, 8 pages.

Tachikawa et al., "Robust Estimation of Light Directions and Diffuse Reflectance of Known Shape Object," VMV, 2009, 8 pages.

Takai et al., "Difference Sphere: An Approach to Near Light Source Estimation," Computer Vision and Image Understanding, 2009, vol. 113, Issue 9, 8 pages.

Takai et al., "Self Shadows and Cast Shadows in Estimating Illumination Distribution," 4th European Conference on Visual Media Production, IETCVMP, 2007, 10 pages.

Wen et al., "Face Relighting with Radiance Environmental Maps," 2003 IEEE Computer Society Conference on Computer Vision and Pattern Recognition, vol. 2, 12 pages.

"New Photo editing tool enables object images to be manipulated in 3-D (w/Video)," http://phys.org/news/2014-08-photo-tool-enables-images-d.html, Aug. 5, 2014, 10 pages.

Office Action issued in Japanese Patent Application No. 2016-566971 dated Feb. 13, 2018, 4 pages.

Office Action issued in Japanese Patent Application No. 2018-117683 dated Aug. 20, 2019, 9 pages.

Oishi et al., "Achieving Geometric Consistency for Mixed Reality using Reconstructed 3D Models," The Virtual Reality Society of Japan, 2012, vol. 17, No. 4, pp. 399-408.

Decision of Patent issued in Japanese Patent Application No. 2018-117683 dated Dec. 10, 2019, 4 pages.

Loscos et al., "Interactive Virtual Relighting of Real Scenes," IEEE Transactions on Visualization and Computer Graphics, vol. 6, No. 4, 30 pages.

* cited by examiner

AUGMENTED REALITY CONTENT RENDERING VIA ALBEDO MODELS, SYSTEMS AND METHODS

CROSS-REFERENCE TO RELATED APPLICATIONS

This application is a continuation of U.S. application Ser. No. 16/883,966 filed May 26, 2020, which is a divisional of U.S. application Ser. No. 16/259,774 filed Jan. 28, 2019, which is a continuation of U.S. application Ser. No. 15/707,815, filed Sep. 18, 2017, which is a continuation of U.S. application Ser. No. 14/711,763, filed May 13, 2015, which claims the benefit of U.S. Provisional Application No. 61/992,804, filed May 13, 2014. The entire content of that application is these applications are hereby incorporated herein by reference.

FIELD OF THE INVENTION

The field of the invention is augmented reality technologies.

BACKGROUND

The background description includes information that may be useful in understanding the present invention. It is not an admission that any of the information provided herein is prior art or relevant to the presently claimed invention, or that any publication specifically or implicitly referenced is prior art.

With the advent of camera-based portable devices (e.g., cell phones, tablets, game systems, etc.), there has been a growing rise in desire for augmented or virtual reality content. Augmented reality content can be superimposed on images of real-world objects to enhance a consumer's experience. For example, U.S. Pat. No. 6,546,309 to Gazzuolo titled "Virtual Fitting Room", filed Jun. 29, 2001, describes a process by which a consumer's measurements are determined based on a mathematical model of a body. The measurements are then used to adjust a garment model, which can then be superimposed on an image of the consumer. The approach taken by Gazzuolo allows the consumer to "virtually" try on the garment.

Although there are numerous examples across many market segments of superimposing augmented reality (AR) content on the real-world, humans can still determine that the superimposed AR content is fake. The reason is that the AR content is rendered as crisp, computer generated graphics that do not match the actual nature of the real-world as imaged by a device sensor.

Others have put forth effort to modify content so that it appears more natural. U.S. patent application publication 2013/0002698 to Geiger et al. titled "Virtual Lens-Rendering Augmented Reality Lens", filed Jun. 30, 2011, describes techniques for modifying the illumination characteristics of a scene based on environmental illumination information. When the scene is rendered, the modification provides for additional realism.

Still others have attempted to use object information to aid correcting images. For example, U.S. Pat. No. 8,538,144 to Benitez et al. titled "Methods and Systems for Color Correction of 3D Images", filed internationally on Nov. 21, 2006, discusses using albedo information determined during image capture to correct color information. Additionally, U.S. patent application publication 2014/0085625 to Ahmed et al. titled "Skin and Other Surface Classification using Albedo", uses albedo information about types of materials (e.g., skin) to determine albedo for objects.

U.S. Pat. No. 7,324,688 to Moghaddam titled "Face Relighting for Normalization of Direction Lighting", filed Feb. 14, 2005, uses albedo to determine lighting direction from an input image. Moghaddam using skin albedo information to construct an albedo map from an image of a person's face, from which lighting information can be obtained.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY

It has yet to be appreciated that there are circumstances in which it is possible to know (or estimate) the true albedo of an object a priori; a constructed object for example (e.g., toy, automobile, etc.). Such information can provide for rendering augmented reality content in a more realistic manner given the context of the real environment in the vicinity of a rendering device. Thus, there remains a need for rendering augmented reality content based on known object properties, albedo for example.

The inventive subject matter provides apparatus, systems and methods in which a augmented reality content can be displayed over an image of a real-world object in a manner where the augmented reality (AR) content appears as a natural part of the real-world environment. One aspect of the inventive subject matter includes a computer implemented method of rendering AR content. In one embodiment, the method includes obtaining one or more a priori defined 3D albedo models of an object. The albedo model preferably comprises information about the reflective nature of the object as well as geometrical information of the model, normal vectors for example. The AR model further includes known features that relate to the object. The method further includes deriving features (e.g., FAST, SIFT, Harris corners, etc.) from a digital representation of the object, perhaps an image or a video frame that includes a digital representation of the object. The rendering device continues by obtaining AR content based on the observed features where the AR content comprises information about how it is to be presented relative to the object (e.g., object model information, known features, animations, programmatic instructions, etc.). The rendering device can derive a pose of the object based on the observed object features from the digital representation. The rendering device proceeds by aligning the albedo model to the pose, possibly based on comparing observed features of the object and on known features incorporated into the albedo model. The rendering device uses the digital representation and the aligned albedo model to derive observed shading. The observed shading is used to derive an estimated shading model (sometimes referenced herein as an environmental shading model). In some embodiments, a sensor environmental error map is derived that includes sensor error(s), object distortions or deviations (e.g., dirt, scratches, smudges, etc.), or other parameters. The sensor environmental error map indicates a difference between how the object should appear and how it actually appears to the sensor. The method further comprises generating environmentally adjusted AR content by applying the estimated shading model to the AR content. Thus, the rendering device transforms the AR content into content having an appearance that would be considered similar to the appearance of the imaged object. Finally, the environmentally adjusted AR content can be rendered on a device for consumption by a user. In some embodiments, environmental artifacts identifiable in an environmental error map are also rendered with the AR content to give it an even more realistic feel.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
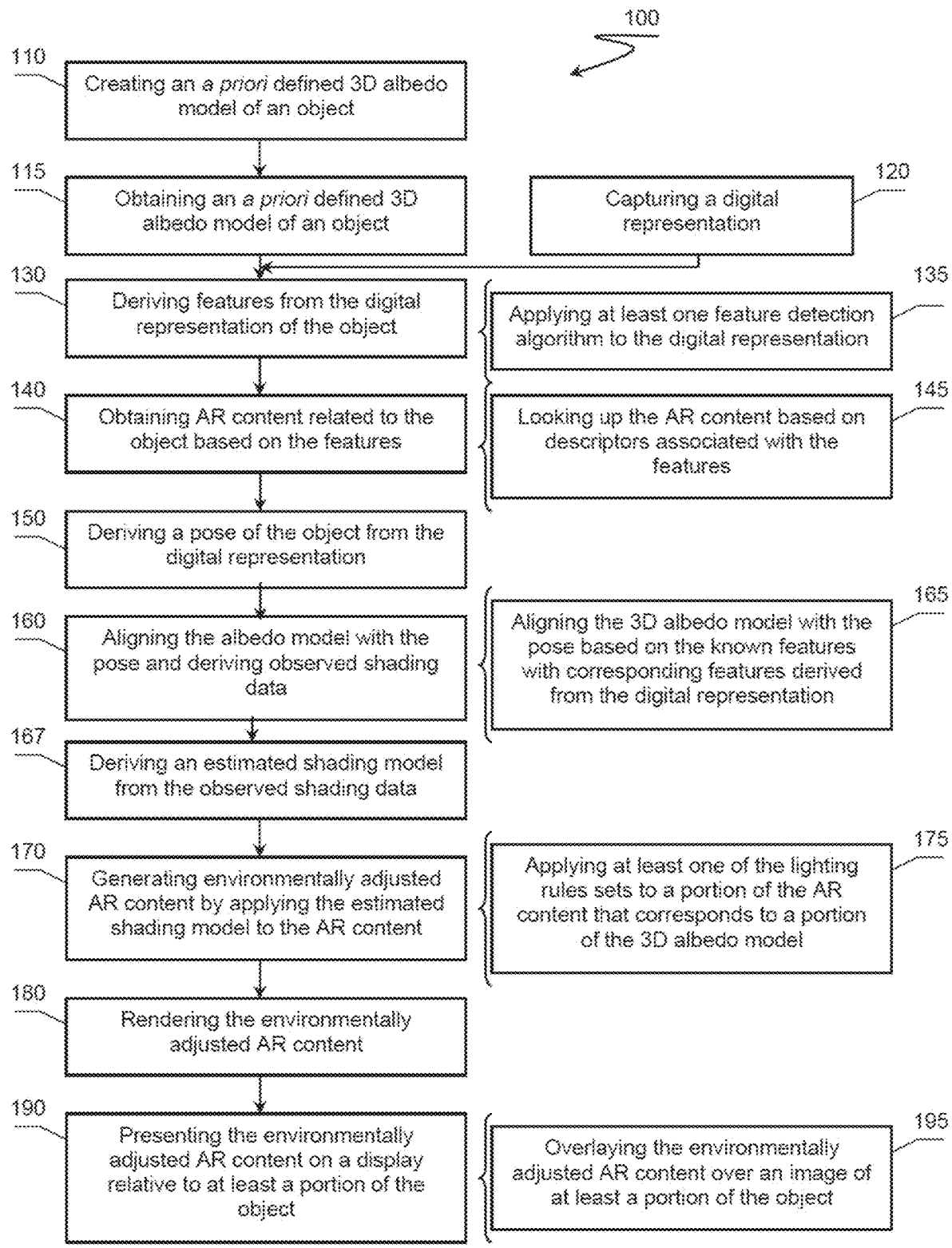
FIG. 1 is a schematic of a method for rendering AR content.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including aligning albedo models to observed objects. Based on the alignment, a computing device is able to determine the conditions under which a sensor observed the object. AR content can then be presented or rendered for consumption by a user in a manner that reflects the conditions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The following discussion presents the inventive subject matter from the perspective of overlaying AR content on a toy. The AR content is adjusted so that it appears to blend in more naturally with the surrounding objects when the AR content displayed in conjunction with images of real-world objects. The examples provided are discussed with respect to superimposing AR content (e.g., animation, etc.) of a doll's face on an image of a doll. One should appreciate that the disclosed techniques can also be applied to other types of objects including printed media, medical images, vehicles, buildings, appliances, or other types of objects.

Figure 3:
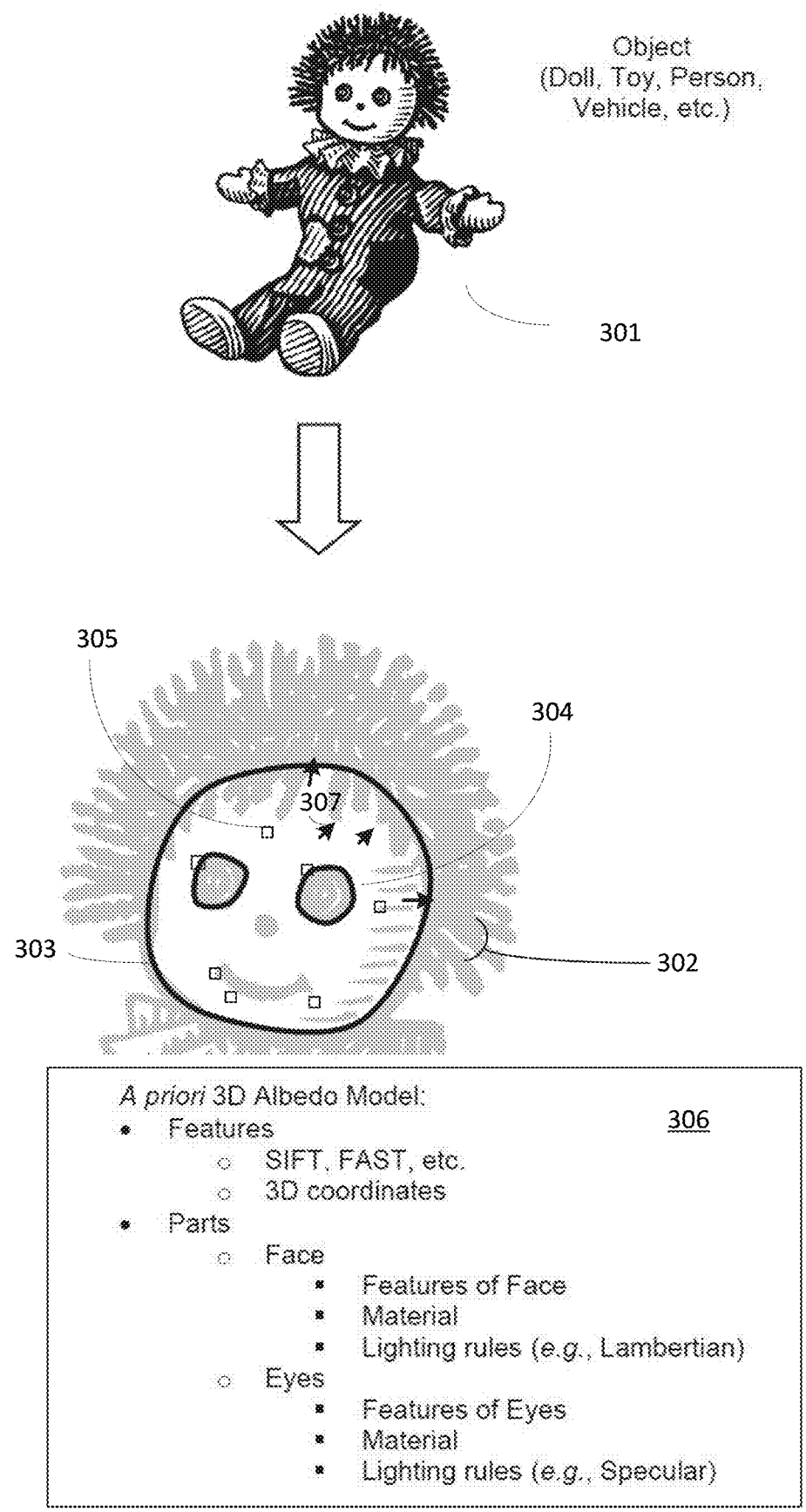
FIG. 3 illustrates characteristics of a 3D albedo model construction from a known object.
Figure 4:
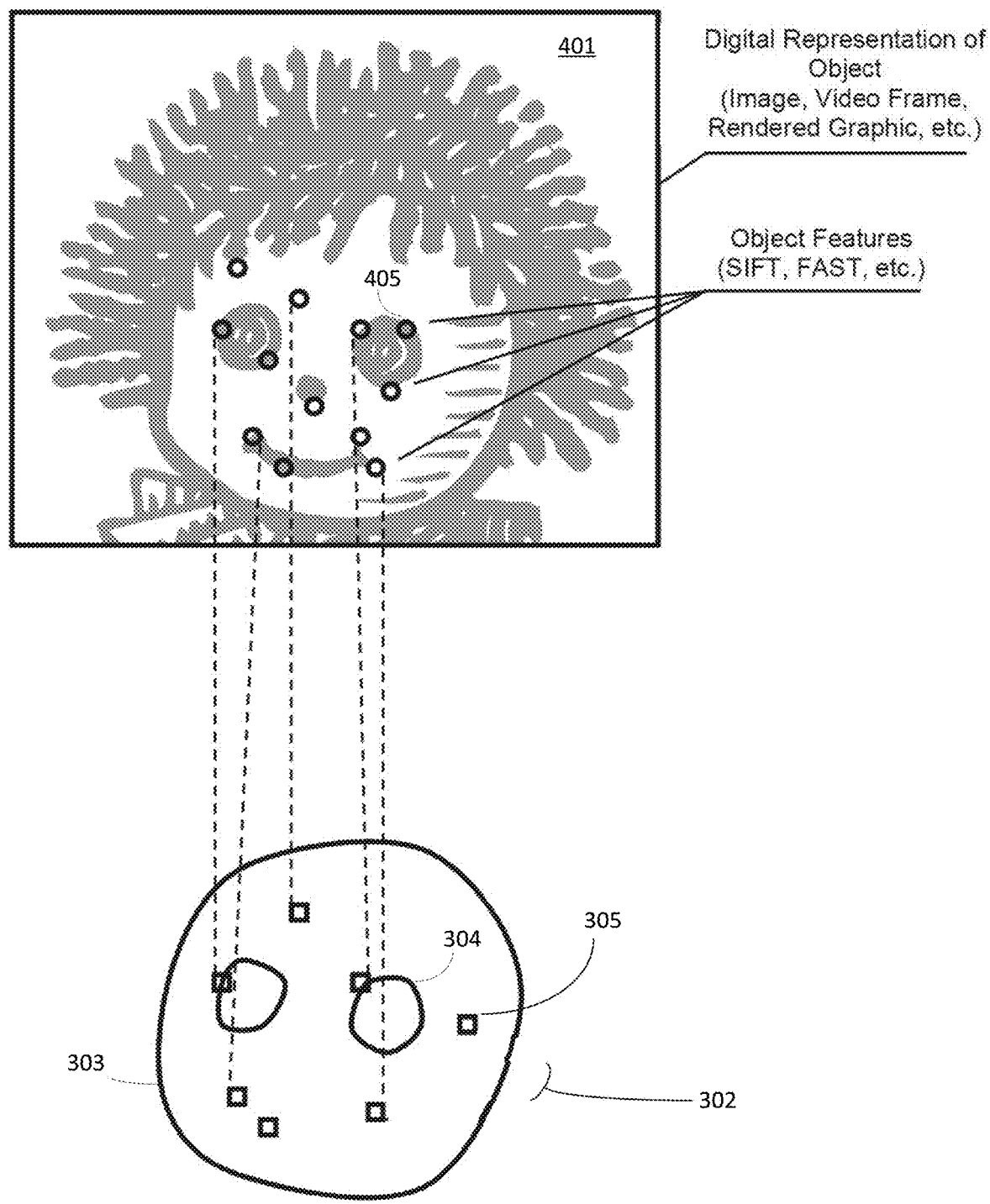
FIG. 4 illustrates alignment of a 3D albedo model to an observed pose of an object.

FIG. 1 illustrates a method 100 of rendering AR content. FIGS. 3 and 4 provide further details regarding some of the steps in method 100 and will be discussed together with method 100. Method 100 represents a set of steps performed by a rendering device configured or programmed to operate according to the recited steps. The rendering device represents a computing device having at least one processor and memory storing software instructions that cause the device to render AR content as disclosed. Example devices that can be configured or programmed to operate as the rendering device include cell phones, smart phones, tablets, phablets, gaming consoles, still or video cameras, vehicle navigation systems, robots, security systems, hand-held gaming device, kiosks, appliances, or other types of computing devices.

Method 100 optionally begins with step 110, which includes creating an a priori defined 3D albedo model of an object. The model can be created through various techniques depending on the nature of the object. In the example shown in FIG. 3, the object comprises a doll 301. The albedo model 306 can be defined based on the known geometry of the doll as well as the known properties of the materials composing the doll. Thus, the model could be constructed based on a computer generated model of the doll along with a bill of materials describing the nature of the doll materials.

FIG. 3, for ease of illustration, also shows a graphical representation 302 of albedo model 306. It should be appreciated that albedo model 306 preferably is a 3D model, possibly comprising a mesh. The albedo model includes multiple properties that are of use with the disclosed technique. First, the model includes normal vectors 307 distributed over surface of the model where the normal vectors are orthogonal to surface. At each normal vector, the model further comprises albedo information for the corresponding location. The albedo information represents the true reflective nature of the object at that point. For example, the albedo information associated with the doll's facial skin material might represent a slightly non-reflective matte plastic, while the albedo information associated with the doll's eye material might represent a highly reflective glass or plastic bead. Thus, the albedo information across the surface of the model could be discontinuous. It is also possible for the albedo information to be continuous in a manner where the albedo model information can be calculated as a function of geometry of the surface. Such an approach provides for a procedurally generated albedo model. Rather than transferring a completed albedo model to the rendering device, the procedure (e.g., function, software instructions, rules, geometry, etc.) could be transferred instead. Thus, the rendering device can procedurally generate the albedo model locally rather than incurring the bandwidth cost for transferring an a priori constructed model. This approach is considered advantageous in circumstances where bandwidth is limited or costly; perhaps on a cell phone with a limited data plan for example.

The 3D albedo can also be broken down into portions associated with the object. In the example shown, the portions included in the model comprise two eye portions 304 and a face portion 303. It should be appreciated that the 3D model can comprise multiple portions as necessary to support the rendering of the AR content. Further each portion could comprise a separate lighting policy that includes lighting rules set associated with corresponding portions of the 3D albedo model. The lighting rules govern how corresponding aspects of AR content should be rendered when presented, possibly overlaid, on a display device. For example, the skin or face of the doll might use Lambertian lighting techniques due to the skin surface being a matte finish. The eyes of doll might include highly reflective glass or plastic, in which case the lighting rules might include instructions for specular lighting. Additional lighting rules might include Phong lighting, Phong shading, Gaussian filters, or other types of lighting algorithms. The lighting rules could be associated with a facial feature, a weapon, a panel, an article of clothing, a vehicular feature, a type of printing ink, a tissue type, a substrate, a game feature, a material type, or other type of object feature.

The 3D albedo model can also comprise registration features 305 so that the model can be properly fit to corresponding real-world objects. The registration features for image data could include features derived from image processing algorithms such as SIFT, BRISK, SURF, FAST, BRIEF, Harris Corners, Edges, DAISY, GLOH, HOG, EOG, TILT, or others. Such features are advantageous because it allows the rendering device to identify a correct model as well as recognize the object in the field. Each feature within the albedo model can comprise a descriptor value, a 3D coordinate in the model, or other information.

The 3D albedo model can be constructed during an offline process by a device other than the rendering device, perhaps as part of an object ingestion engine. For example, when the doll's designer is building a model of the doll in a CAD system, the CAD system builds the albedo model as a computer generated object model. Each polygon of the mesh in the computer generated model could comprise a normal vector along with corresponding albedo information. It should be further appreciated that the computer generated model could just represent a portion of the object; the face of the doll for example. Thus, the 3D albedo model could represent one or more of the following: a toy, a vehicle, a face, a purchasable product, a printed media, a vending machine, an appliance, a plant, a sign, a tissue, a patient, a game component, a person or their face, or other type of object. In an alternative embodiment, the device can, at runtime, build a 3D representation of the doll. By averaging sensor observations of features over multiple views (and preferably variable lighting conditions) an estimate for the albedo model may be generated at runtime.

Step 115 includes the rendering device obtaining the a priori defined 3D albedo model of the object. To continue the example of the doll, the rendering device could include a tablet device that has been configured with an app to interact with the doll where the app includes the albedo model for the doll. In other scenarios, the rendering device could capture a digital representation (e.g., image, video, audio, etc.) of the object as suggested by step 120. The rendering device could then recognize the object from the digital representation using known techniques as described in co-owned U.S. Pat. No. 7,016,532 to Bonyck et al. titled "Image Capture and Identification System and Process", filed Nov. 5, 2001. Once recognized, the rendering device can use the derived characteristics (e.g., image characteristics, descriptors, etc.) from the digital representation to retrieve the albedo model from a database or from other types of data store. Furthermore, as referenced above, the device can, in an alternative embodiment, build a 3D representation of the doll at runtime by averaging sensor observations of features over multiple views (and preferably variable lighting conditions) to generate an estimate for the albedo model.

Step 130 includes the rendering device deriving features from the digital representation of the object. The derived features can take on many different forms depending on the modality of the digital representation. With respect to image data, the rendering device can apply one or more feature detection algorithms to the digital representation as indicated by step 135 to generate the features. Example algorithms could include SIFT (see U.S. Pat. No. 6,711,293 to Lowe titled "Method and Apparatus for Identifying Scale Invariant Features in an Image and Use of Same for Locating an Object in an Image", filed Mar. 6, 2000), BRISK, SURF, FAST, BRIEF, Harris Corners, edges, DAISY, GLOH, Histograms of Gradients (HOG), Edge Orientation Histograms (EOG), TILT (see U.S. Pat. No. 8,463,073 to Ma et al. titled "Robust Recovery of Transform Invariant Low-Rank Textures", filed Nov. 29, 2010). It should be appreciated that the derived features can be similar to the features used to obtain the 3D albedo model referenced previously.

Step 140 includes the rendering device obtaining AR content related to the object based on the features derived in step 130. The AR content can be indexed into a database or data structure according to descriptors associated with the object. For example, the AR content comprising a computer animation of the doll could be stored in a memory of a tablet running an app. The animation corresponding to the doll can be retrieved when sufficient descriptors from the digital representation match those used to index the animation content in memory. In some embodiment, the AR content, or pointers to the AR content, can be indexed within a data structure that support a k-Nearest Neighbor (kNN) look-up; perhaps a spill tree or k-d tree. For example, as suggested by step 145, the method can further include looking up the AR content based on descriptors associated with the features. Still further, the AR content could be obtained from a database, remote look-up, search engines, or other data stores.

The AR content can reside local to the rendering device as discussed above. Alternatively, the AR content could be stored remotely. In such embodiments, the rendering device can use an address, perhaps a search result of the kNN look-up, to obtain the AR content. Example addresses can include URLs, file handles, URIs, IP address, an index, document object identifiers (DOI), or other types of address.

The AR content itself can comprise a broad spectrum of content. More preferred content includes visual content that can be rendered and can be presented via a display screen coupled with the rendering device. Example AR content includes a game, an application, a video, an image, an animation, a 3D rendered object, an object mesh, an animated mesh, an age projected animation, a medical image, clothing, makeup, glasses, furniture, a wearable accessory (e.g., ring, necklace, etc.), a person, an avatar, a pet, a coupon, a store shelve, signage, a part of anatomy, a sonogram, or other types of items. Although more preferred AR content includes visual content, the AR content can also include other types of modalities; audio, tactile, etc. for example. Note that, in alternative embodiments, the AR content can be looked up later in the illustrated method flow, for example, after deriving an estimate shading model 167. In general, steps can be performed in a different order shown to the extent context does not dictate that the carrying out one step is dependent on using completed results from another step.

Step 150 includes the rendering device deriving a pose of the object from the digital representation. The pose can be determined based on several pieces of information. In some embodiments, the rendering device can store an object model, perhaps the 3D albedo model, which includes known reference features as discussed previously. Once the observed features are derived from the digital representation, the object model can be posed so that the known reference features align with or relative to the observed features. The pose information is useful in embodiments where the AR content is intended to be overlaid on an image of the object. The pose information can also be useful when the AR content is intended to be juxtaposed relative to the object in a displayed image. Returning back to the doll example, the AR content might be fairies located in the image to where the doll points or is gazing. It should be appreciated that the pose is oriented with respect to the sensor capturing the digital representation; the camera capturing an image of the object for example.

Recall that the 3D albedo model can also include known reference features. The albedo model features can be used at step 160, which includes aligning the albedo model with the pose to set up the system of equations for solving for the object shading model. The albedo model can be aligned by aligning the known features within the albedo model to corresponding features derived from the digital representation as indicated by step 165. Once the albedo model and the image are aligned, the difference between the two can be used to derive observed shading data.

FIG. 4 illustrates aligning the 3D albedo model of a doll's face to an observed image of the doll. FIG. 4 shows a digital representation 401 of an object, in this case the doll's face. The object features 405 can be derived from digital representation using known image feature algorithms, e.g., SIFT, FAST, etc. Certain features 405 of digital representation 401 can be can be matched with certain training features 305 from the representation 302 of albedo model 306. The matched features can be used to align the image 401 with albedo model 306 (represented by graphical representation 302 in FIG. 4). Of particular note, there is no requirement that all features, or their descriptors, should be used or should be identical.

Returning to FIG. 1, step 167 includes the rendering device deriving the estimated shading model from the observed shading data. The observed shading data corresponds to how one or more sensors acquiring the digital representation perceive the shading of the object in the environment of the sensor and the estimated shading model is derived from that data in order to apply estimated shading to AR objects related to the imaged object. The estimated shading model can comprise pixel level information related to the object in view that the object shading data is derived from both the observed pose as well as the a priori defined albedo model. For example, the lighting of a pixel associated with a displayed image of the object can be derived from the calculated albedo from the albedo model and the actual, observed color values of the pixel in the pose as captured. The estimated shading model can be considered a transform that converts computer graphic information from its ideal state to a state that conforms to the shading in the sensor-observed environment.

At this point the rendering device has two pieces of information relating to the object. The rendering device has an understanding how the object actually appears in the environment to the sensor capturing the digital representation and how the object should look in a pristine, ideal state via the a priori defined 3D albedo model. The combination of this information is utilized to estimate the unknown parameters of the shading model and embodied as the estimated object shading model.

The estimated shading model carries a great deal of information about the lighting environment without necessarily needing to separate out the underlying sources/types of information. For example, the estimated shading model captures the nature of the lighting on the target object without necessarily determining the actual lighting source. This is achieved by, possibly at a pixel level, determining the difference between the observed object via the sensor and the known ideal condition of the object based on the albedo model. However, an environment error map can be derived from comparing the actual representation (based on the digital representation of a captured image of the object) to the expected representation (based on the estimated shading model relative to the albedo model). Such an error map can identify artifacts related to the sensor or otherwise present in the environment. As an example of this, consider a scenario where a cell phone's lens has a finger print smudge on the surface of the lens. Although the smudge does not affect the lighting in the environment (and therefore the expected shading of the object), it will affect the nature of the captured digital representation. Further, the smudge will affect how captured images will be displayed or rendered for the user. The sensor environment error map will account for such sensor-related anomalies without explicitly estimating such an anomaly. The sensor-error map approach is generally advantageous because it offers a lightweight approach for determining an impact of the environmental artifacts, at a point of capture via a sensor, on the captured data. It should be appreciated that the sensor, a camera for example, is the last point of entry of data into the device as it leaves the environment. Thus the data collected by sensor represents the observed environmental state of the object. Therefore, in an alternative embodiment (and as illustrated further in the context of FIG. 7), an environmental error map can be used to supplement the method illustrated in FIG. 1 to identify sensor environment anomalies to be included in the rendering of AR content to give it a more realistic feel.

The estimated shading model and/or a sensor environment error map could comprise multiple features, although it is not necessarily required. One possible feature is that the sensor environment map could include an environment lighting map. The lighting map can be derived by comparing the albedo model of the object with the object's observed colors. Further, as suggested above, the sensor error maps can indicate deviations from a nominal state; a smudge, lens shape, scratches, etc. Still further, a sensor environment map could also include a noise map indicating the environment's impact on acquiring the digital representation. With respect to noise, consider a system embodying the disclosed techniques that captures the digital representation via ultrasound transducers. The noise associated with tissues, reflections for example, would contribute to the noise map. In such an embodiment, an objects tissue density, for example, might provide the acoustic equivalent of the object's albedo model. Such an embodiment illustrates that environmental models or maps other than, or in addition to, an estimated shading model can be used to affect how AR content is rendered to make it feel more realistic. Yet another embodiment can comprise sensor environment maps that include observed deviations or distortions from the object's natural state. For example, a doll's face might include scratches or pen marks. These features can be retained and incorporated into the AR content when rendered. The rendering device can observe such distortions based on differences between a known object model and the observed object. The known object model can be incorporated into, or be distinct from, the albedo model.

Step 170 includes generating environmentally adjusted AR content by applying the estimated shading model to the AR content. As discussed previously, the estimated shading model (or sometimes referred to herein as an environmental shading model) represents a transform that converts the AR content from its more ideal state to a state that better aligns with how the rendering device has observed the object. The AR content can be adjusted by applying one or more lighting rules sets from the 3D albedo model to portions of the AR content that correspond to portions of the model as suggested by step 175. The matching of the rules sets to correct portions of the AR content can be achieved through geometrical constraints (e.g., polygons, bounding boxes, etc.), recognition features (e.g., descriptors, key points, etc.), or other matching technique.

As an example, consider a scenario where a doll, say a Disney® princess doll, is sold in conjunction with a downloadable augmented reality app. The app might allow a child to converse with the princess in a tea party setting. The child captures real-time video of the doll with a tablet, for example. In response, the app overlays AR content in the form of an animation of the doll face speaking or responding to the child's questions. The lips, eyes, and skin of the animation can be adjusted individually according to their own rules within the albedo model so that they are presented to the child in a more natural manner.

Step 180 includes the rendering device rendering the environmentally adjusted AR content. The rendering process includes converting the AR content according to rules generated from the sensor environment map information as well as other factors in the system. For example, the pose information can be used to account for line of sight or removal of hidden surfaces. Further, the position or orientation of the sensor capturing the digital representation can be used to translate the AR content to a correct position for rendering.

Step 190 comprises presenting the rendered environmentally adjusted AR content on a display. The display could be integral with the rendering device. For example, the rendering display could be a tablet as discussed in the previous example where the tablet is the rendering device. In other embodiments, the display could be remote from the rendering device. Perhaps the display device is a computer screen of a client computer while the rendering device is a web server or service providing it's rendering services over the Internet. It should be appreciated that the rendered environmentally adjusted AR content could be overlaid over an image of the at least a portion of the object as describe in step 195. Alternatively, the adjusted AR content could be presented relative to the location of the object in the display. It is also possible that the adjusted AR content might be outside of a current field of view and is off screen. When in view, the adjusted content can then be presented. Perhaps the doll's AR content might include images of friends, periodically off screen, that are seated relative to the doll's location. AR content may also be placed according to properties of the estimated environment map. For example, the method can be used to render a cloud at a set radius away from the object and position it such that it is always located at the darkest point in the environment map.

Figure 2:
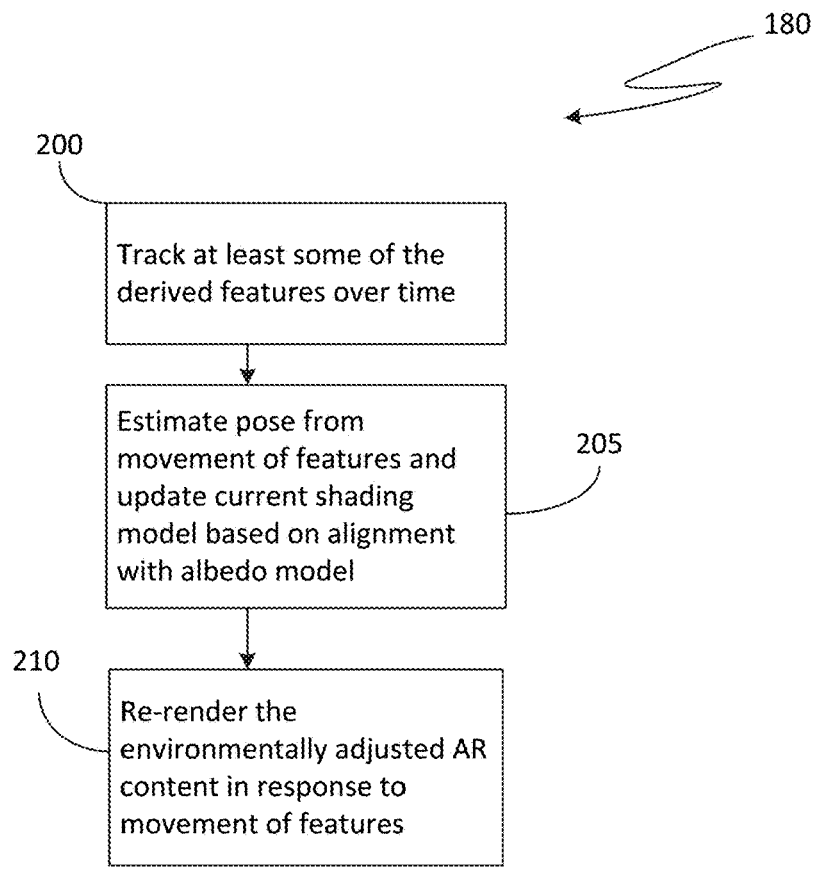
FIG. 2 is a schematic of a portion of the FIG. 1 method for tracking objects and re-rendering AR content.

In view that the environment in which the target object is observed can be quite dynamic, some embodiments of the rendering device provide for real-time tracking of the object as discussed in reference to FIG. 2. In some sense, the tracking capabilities illustrated in FIG. 2 can be considered to be part of the rendering process discussed with respect to step 180 of method 100.

Step 200 tracks at least some of the features derived from the digital representation. One should appreciate that tracked features do not necessarily have to correspond to the features that were used to recognize the object in the first place. For example, the rendering device might use SIFT features and descriptors to recognize the object and then use FAST features for tracking. Step 205 estimates an updated pose of the tracked object and updates the current object shading model. Step 210 re-renders the environmentally adjusted AR content in response to movement of the features, especially in relation to the capturing sensor. The re-rendered content can take into account differences in poses of the object, differences in facing, predicted movement, or other aspects associated with movement of the object or features. In one embodiment, step 205 re-estimates the pose to update the shading model and step 210 re-renders the environmentally adjusted AR content at substantially a frame of the video sequence (e.g., 10 fps, 20 fps, 30 fps, 60 fps, etc.), which further enhances the natural experience of the user.

The disclosed techniques give rise to interesting capabilities. One possible capability includes using known albedo models of objects (e.g., people, vehicles, etc.) and incorporating such object into old video sequences. For example, a 3D albedo model can be constructed for an object known to exist in the old video sequence (e.g., black and white images, old sitcoms, etc.). By comparing the old video recording of the object can comparing it to the newly created albedo mode, a rendering device can determine the transformations necessary to integrate AR content into the video recording. Such known objects might include buildings that are still in existence, automobiles, furniture, or other objects in the sequence.

In a shopping environment, retailers or product providers could use the disclosed techniques to enrich a consumer's shopping experience. The product provider can provide known albedo models of their products; a beverage can for example. When a consumer images the beverage can, the AR content can integrate into the environment and allow the consumer to interact with the beverage can. Perhaps Coke Cola® would provide an app that uses the known albedo model to present an AR cooking assistant that provides recipes on how Coke® could be used in cooking.

Figure 5:
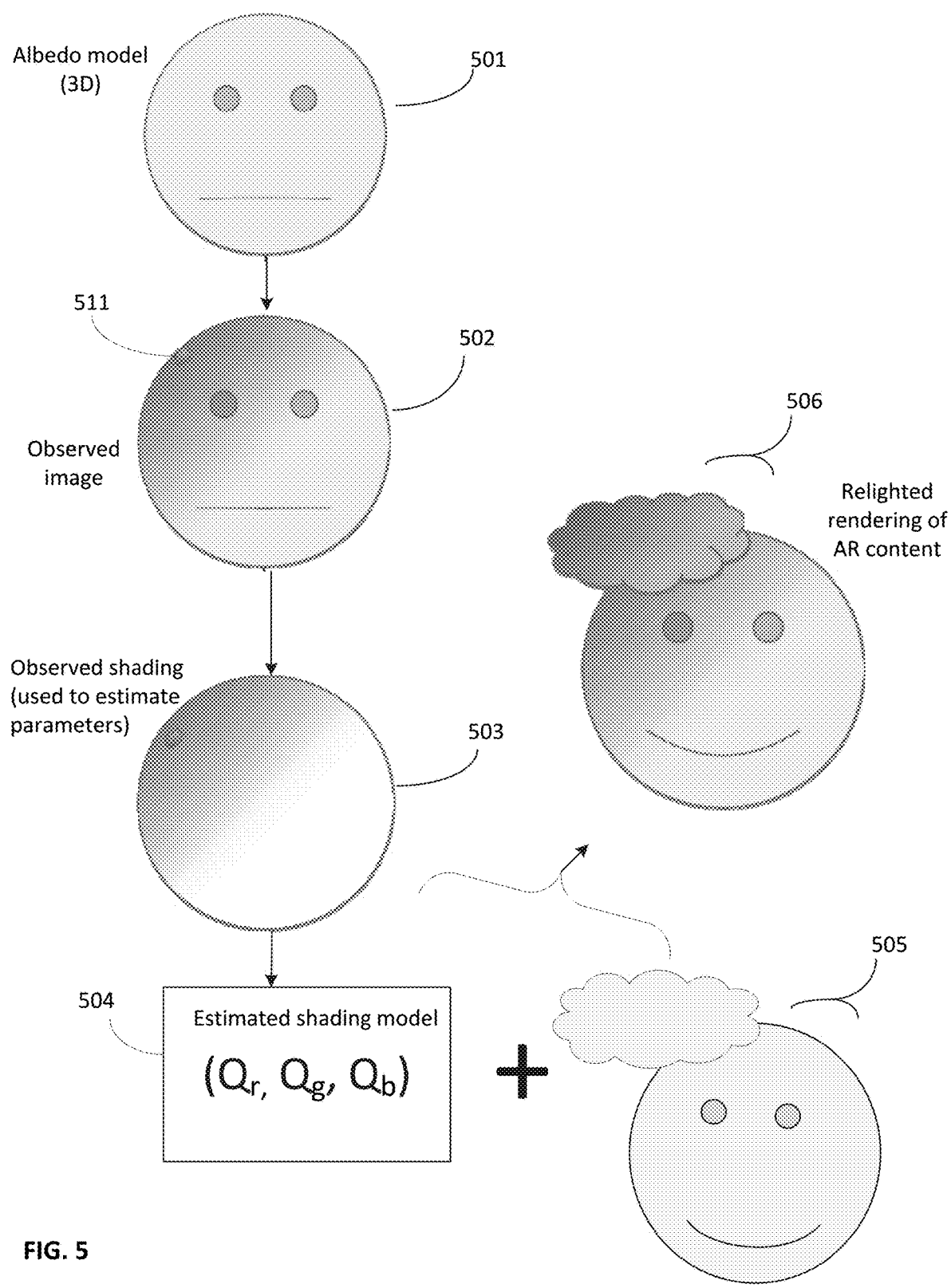
FIG. 5 is a graphical illustration of the process carried out to obtain the adjusted rendered augmented reality content.

FIG. 5 graphically illustrates the image processing flow carried out by an embodiment of the invention. An 3D albedo model 501 of a doll's face is obtained and aligned with a captured (observed) image 502 of the doll's face. Note that image 502 includes an artifact 511, which might be due to a smudge on the lens of a tablet or other device capturing the image. Generating an error map that accounts for the artifact and can be used to supplement rendering of AR content is discussed further in the context of FIG. 7. Returning to FIG. 5, to the observed shading 503 is extracted from the image 502 using albedo model 501. Estimated shading model 504 is obtained from observed shading 503 as further described below. Observed shading 503 is used to modify AR content 505 to take into account lighting conditions in a particular environment of the device rendering the AR content. Specifically, shading model 504 is combined with AR content 505 to produce relighted, rendered content 506.

The following discussion presents the subject matter from a mathematical perspective in conjunction with the image processing flow represented in FIG. 5.

In general the value, $I_c(p)$, of a color channel, c, at a pixel, $p \in \mathbb{R}^2$, in an image, I, can be modeled as a function of albedo and shading (where $\text{Albedo}_c(p) \in \mathbb{R}$ and $\text{Shading}_c(p) \in \mathbb{R}$):

$$I_c(p) = \text{Albedo}_c(p) * \text{Shading}_c(p) \quad \text{Eq. 1}$$

For simplicity of notation and at no loss of generality, assume that all pixels in the image correspond to a known object. In practice, shading model estimation depends only on the subset of image pixels that correspond to a known object. After alignment each pixel in an image is in correspondence with the 3D albedo model, $A_c: \mathbb{R}^3 \to \mathbb{R}$. Thus for a pixel, p, we have its 3D location $X \in \mathbb{R}^3$, its normal $N \in \mathbb{R}^3$ and its albedo for each color channel, $A_c(X) \in \mathbb{R}$.

Given the albedo of each 3D location on the model we can, after alignment, extract the observed shading via:

$$\text{ObservedShading}_c(p) = I_c(p)/\text{Albedo}_c(p) \quad \text{Eq. 2}$$

This is possible because we have a correspondence between each observed pixel, p, and its 3D point, X, thus:

$$\text{ObservedShading}_c(p) = I_c(p)/A_c(X) \quad \text{Eq. 3}$$

We also have at each p a 3D normal, N. In many cases we can model shading due to environmental lighting as a function of normal only, thus:

$$\text{Shading}_c(p) = S_c(N) \quad \text{Eq. 4}$$

Where N in Eq. 4 is the normal that corresponds to p, and $S_c: \mathbb{R}^3 \to \mathbb{R}$, is a function.

We can further approximate the true shading model as a 2nd order function:

$$S_c(N) = N^T * Q_c * N \quad \text{Eq. 5}$$

Where $Q_c$ is a 3×3 matrix, and $N^T$ is the transpose of N. We can then estimate $Q_c$ by minimizing the function $$\sum_i \|N_i^T * Q_c * N_i - \text{ObservedShading}_c(p_i)\|$$

where i is a pixel index from the set of all image pixels with 2D to 3D correspondences. We can solve for the entries of $Q_c$ via standard least-squares estimation. Note that $Q_c$ can be determined based on wherever we have correspondences, i.e. throughout the model or only at feature points.

One could conceive posing this task as more complex optimization problems which may include inference of an additive noise model from some distribution, sparsity constraints on the residual of the optimization function or the residual in the image domain, or incorporate other assumptions about the sensor or environment as additional constraints.

Once we have estimated the shading model parameters, $Q_c$, for each image channel, we can render the projection of any AR content (for which we have the true 3D geometry and albedo models, $A_c$) according to the shading model by simply substituting the estimated $Q_c$ and albedo model of the AR object into $S_c(N)*A_c(X)$.

Figure 6:
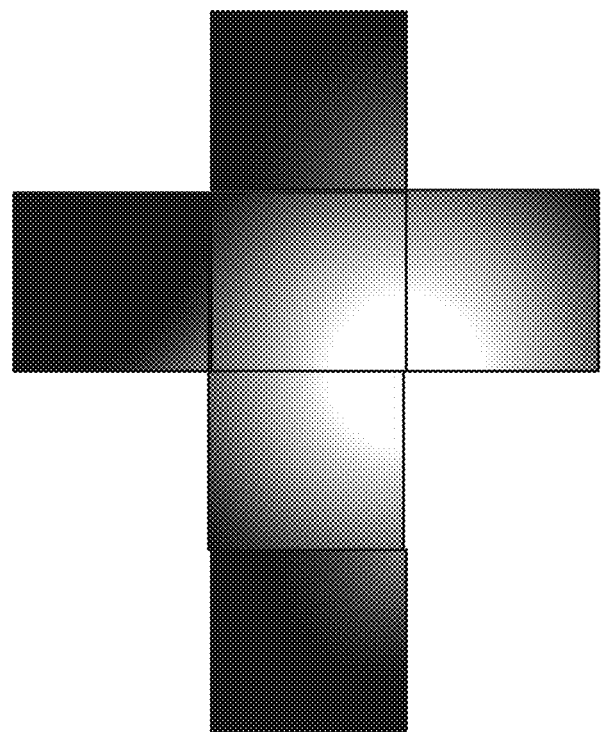
FIG. 6 is a graphical representation of the estimated shading model of FIG. 5 as a function of surface normals

FIG. 6 graphically shows, for illustrative purposes, that the shading model estimated by $Q_c$ can be visualized as a function of the normal projected onto the surface of a sphere or cube to form a shading environmental map 504N.

Figure 7:
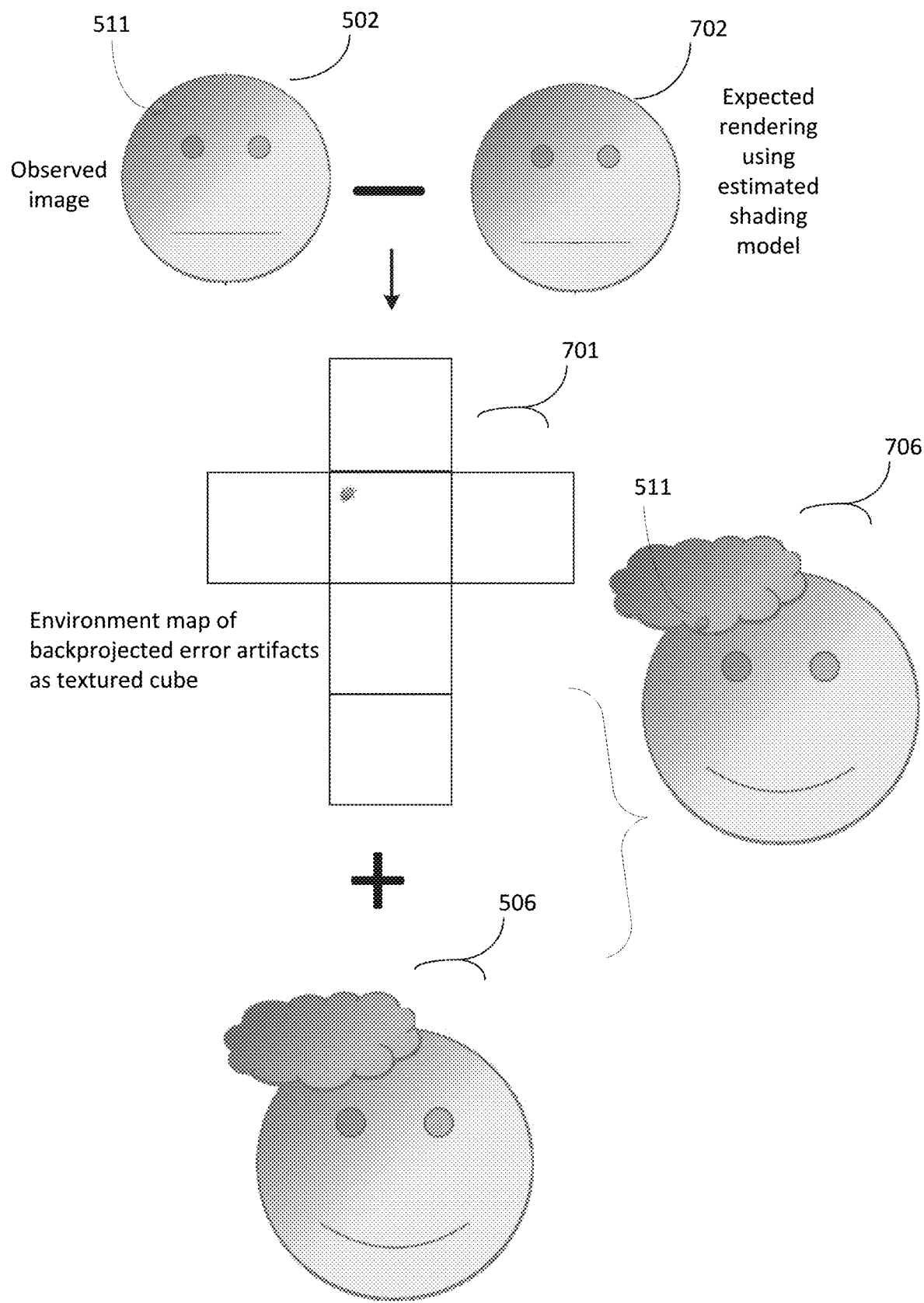
FIG. 7 is a graphical illustration of further processing that can be used to adjust rendering of augmented reality in view of artifacts identified in an environmental error map.

FIG. 7 graphically illustrates a high level processing flow for incorporating environmental anomalies into rendering of AR content. Estimated shading model 504 of FIG. 5 can be used to generate expected rendering 702 of a known 3D object. The residual between the expected appearance 702 and the observed image 502 can then be backprojected according to the geometry of the known object to create an environmental map of errors 701. Such a map is illustrated in FIG. 7 as a textured cube showing backprojected error artifacts. In this case, artifact 511 from observed image 502 is shown in map 701 as illustrated. Map 701 can then be used to supplement rendering 506 to generate rendering 706 which includes the artifact 511. This can make AR rendering 706 appear more realistic. The embodiment of FIG. 7 is useful for potentially capturing smudges or scratches on a lens and/or other types of sensor related artifacts. However, the type of error map illustrated might capture other types of visual artifacts caused by the environment. Also other types of error maps can be created based on discrepancy between an expected rendering of an object and an actual image.

Figure 8:
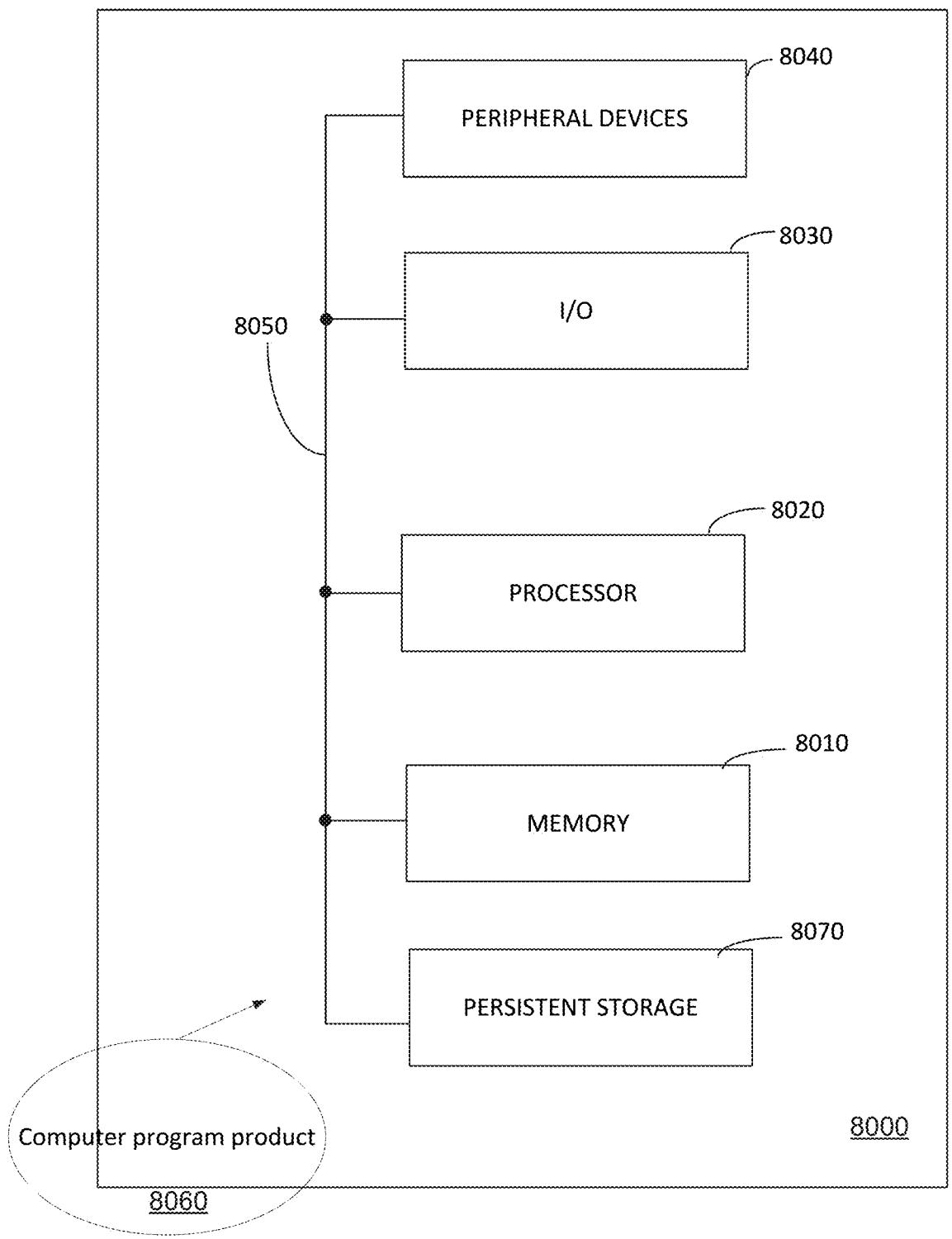
FIG. 8 shows an example of a computer system that may be included in or represent one or more rendering devices and/or other computers used to execute instruction code contained in a computer program product in accordance with an embodiment of the present invention.

FIG. 8 shows an example of a computer system 8000 that may be included in or represent one or more rendering devices and/or other computers used to execute instruction code contained in a computer program product 8060 in accordance with an embodiment of the present invention. Computer program product 8060 comprises executable code in an electronically readable medium that may instruct one or more computers such as computer system 8000 to perform processing that accomplishes the exemplary method steps performed by the embodiments referenced herein. The electronically readable medium may be any non-transitory medium that stores information electronically and may be accessed locally or remotely, for example via a network connection. The medium may include a plurality of geographically dispersed media each configured to store different parts of the executable code at different locations and/or at different times. The executable instruction code in an electronically readable medium directs the illustrated computer system 8000 to carry out various exemplary tasks described herein. The executable code for directing the carrying out of tasks described herein would be typically realized in software. However, it will be appreciated by those skilled in the art, that computers or other electronic devices might utilize code realized in hardware to perform many or all of the identified tasks without departing from the present invention. Those skilled in the art will understand that many variations on executable code may be found that implement exemplary methods within the spirit and the scope of the present invention.

The code or a copy of the code contained in computer program product 4060 may reside in one or more storage persistent media (not separately shown) communicatively coupled to system 4000 for loading and storage in persistent storage device 8070 and/or memory 8010 for execution by processor 8020. Computer system 8000 also includes I/O subsystem 8030 and peripheral devices 8040. I/O subsystem 8030, peripheral devices 8040, processor 8020, memory 8010, and persistent storage device 8060 are coupled via bus 8050. Like persistent storage device 8070 and any other persistent storage that might contain computer program product 8060, memory 8010 is a non-transitory media (even if implemented as a typical volatile computer memory device). Moreover, those skilled in the art will appreciate that in addition to storing computer program product 8060 for carrying out processing described herein, memory 8010 and/or persistent storage device 8060 may be configured to store the various data elements referenced and illustrated herein.

Those skilled in the art will appreciate computer system 8000 illustrates just one example of a system in which a computer program product in accordance with an embodiment of the present invention may be implemented. To cite but one example of an alternative embodiment, execution of instructions contained in a computer program product in accordance with an embodiment of the present invention may be distributed over multiple computers, such as, for example, over the computers of a distributed computing network.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of rendering augmented reality content associated with an object in digital imagery, comprising:

obtaining, by a rendering device, an albedo model related to the object in an environment represented by the digital imagery, the albedo model comprising portions corresponding to at least some features of the object, wherein each portion of the albedo model includes lighting rules selected based on corresponding features of the object;

obtaining, by the rendering device, augmented reality (AR) content;

determining, by the rendering device, an environmental error map based on differences derived from aligning known reference features within the albedo model corresponding to observed environmental features derived from the digital representation;

deriving, by the rendering device, an estimated environmental impact based on the albedo model and the environmental error map;

generating, by the rendering device, an environmentally adjusted AR content by adjusting the AR content according to the estimated environmental impact; and rendering, by the rendering device, the environmentally adjusted AR content.

2. The method of claim 1, wherein the features of the object are based on at least one of geometrical constraints, recognition features, and matching techniques.

3. The method of claim 1, wherein the AR content comprises at least one of an application, a video, an image, an animation, a 3D rendered object, visual content, audio content, and tactile content.

4. The method of claim 1, wherein the albedo model comprises a 3D albedo model.

5. The method of claim 4, wherein the 3D albedo model comprises a computer-generated object model.

6. The method of claim 5, wherein the computer-generated object model comprises a mesh.

7. The method of claim 5, wherein the computer-generated object model comprises a model of a portion of the object.

8. The method of claim 1, wherein the albedo model represents known albedo information for at least a portion of the object.

9. The method of claim 1, wherein the albedo model comprises known features having locations within or on the object.

10. The method of claim 9, further comprising aligning the albedo model with a pose by aligning the known features with corresponding features derived from the digital imagery.

11. The method of claim 1, wherein the albedo model comprises a lighting policy including lighting rules sets associated with corresponding portions of the albedo model.

12. The method of claim 11, wherein generating the environmentally adjusted AR content includes applying at least one of the lighting rules sets to a portion of the AR content that corresponds to a portion of the albedo model.

13. The method of claim 11, wherein the lighting policy sets lighting rules for at least one of a facial feature, an article of clothing, a tissue type, a substrate, and a material type.

14. The method of claim 1, wherein the albedo model is generated from a plurality of training images captured by the rendering device in a variety of lighting conditions.

15. The method of claim 1 further comprising determining, by the rendering device, features from a digital imagery of the object.

16. The method of claim 15, wherein the albedo model is generated from a plurality of training images captured by the rendering device from a variety of viewpoints.

17. The method of claim 16, wherein at least one of the plurality of training images corresponds to the digital imagery of the object from which features are derived.

18. The method of claim 17, wherein the training images are captured by the rendering device in parallel to determining a pose for at least part of the AR content relative to the object from the digital imagery, and wherein the albedo model is updated at runtime as a pose alignment of each new training image is completed.

19. The method of claim 15, wherein determining features from the digital imagery includes applying at least one feature detection algorithm to the digital imagery.

20. The method of claim 19, wherein the feature detection algorithm includes at least one of the following algorithms: SIFT, BRISK, SURF, FAST, BRIEF, Harris Corners, Edges, DAISY, GLOH, HOG, EOG, and TILT.

21. The method of claim 19, wherein obtaining the AR content includes looking up the AR content based on descriptors associated with the features.

22. The method of claim 15, further comprising capturing, by the rendering device, the digital imagery of the object.

23. The method of claim 15, further comprising tracking at least some of the features determined from the digital imagery of the object in real time.

24. The method of claim 23, further comprising re-rendering the environmentally adjusted AR content in response to movement of the object.

25. The method of claim 23, wherein tracking at least some of the features includes tracking features within frames of a video sequence.

26. The method of claim 25, further comprising re-rendering the environmentally adjusted AR content at close to a frame rate of the video sequence.

27. The method of claim 26, wherein the frame rate is at least 30 frames per second.

28. The method of claim 15, further comprising:
using the estimated environmental impact and the albedo model to generate an expected rendering of the object;
using the digital imagery of the object and the environmental error map of the object to identify one or more environmental artifacts in the digital imagery;
rendering, by the rendering device, at least some of the one or more environmental artifacts with the environmentally adjusted AR content.

29. The method of claim 1, further comprising generating the environmentally adjusted AR content by applying a sensor environment map comprising at least one of an environment lighting map, a noise map, and a sensor error map.

30. The method of claim 1, wherein the environmentally adjusted AR content comprises an animation.

31. The method of claim 1, wherein rendering the environmentally adjusted AR content includes overlaying the environmentally adjusted AR content over an image of at least a portion of the object.

32. The method of claim 1, wherein rendering the environmentally adjusted AR content includes presenting the environmentally adjusted AR content on a display relative to at least a portion of the object.

33. The method of claim 1, wherein rendering the environmentally adjusted AR content includes presenting the environmentally adjusted AR content at a spatial location relative to the object that is derived from an environmental feature implied by the estimated environmental impact.

34. A computer program product embedded in a non-transitory computer-readable medium comprising instructions for rendering augmented reality content associated with an object in digital imagery, which, when executed, configure one or more computer processors to perform a method comprising:
obtaining, by a rendering device, an albedo model related to the object in an environment represented by the digital imagery, the albedo model comprising portions corresponding to at least some features of the object, wherein each portion of the albedo model includes lighting rules selected based on corresponding features of the object;
obtaining, by the rendering device, augmented reality (AR) content;
determining, by the rendering device, an environmental error map based on differences derived from aligning known reference features within the albedo model corresponding to observed environmental features derived from the digital representation;

deriving, by the rendering device, an estimated environmental impact based on the albedo model and the environmental error map;

generating, by the rendering device, an environmentally adjusted AR content by adjusting the AR content according to the estimated environmental error map; and rendering, by the rendering device, the environmentally adjusted AR content.

35. An augmented reality content rendering system comprising:

a tangible, non-transitory, computer-readable memory configured to store software instructions for augmented reality content rendering; and at least one processor coupled with the memory and, upon execution of the software instructions for augmented reality content rendering, is configured to operate as a rendering device to:

obtain an albedo model related to an object in an environment represented by the digital imagery, the albedo model comprising portions corresponding to at least some features of the object, wherein each portion of the albedo model includes lighting rules selected based on corresponding features of the object;

obtain augmented reality (AR) content;

determine, by the rendering device, an environmental error map based on differences derived from aligning known reference features within the albedo model corresponding to observed environmental features derived from the digital representation;

derive an estimated environmental impact based on the albedo model and the environmental error map;

generate an environmentally adjusted AR content by adjusting the AR content according to the estimated environmental impact; and render the environmentally adjusted AR content.

* * * * *

UNITED STATES PATENT AND TRADEMARK OFFICE
CERTIFICATE OF CORRECTION

PATENT NO. : 11,710,282 B2
APPLICATION NO. : 17/505576
DATED : July 25, 2023
INVENTOR(S) : Matheen Siddiqui and Kamil Wnuk Page 1 of 1

It is certified that error appears in the above-identified patent and that said Letters Patent is hereby corrected as shown below:

On the Title Page

Under Item (60) Related U.S. Application Data the priority information should read as follows: Continuation of application No. 16/883,966, filed on May 26, 2020, now Pat. No. 11,176,754, which is a division of application No. 16/259,774, filed on Jan. 28, 2019, now Pat. No. 10,685,498, which is a continuation of application No. 15/707,815, filed on Sep. 18, 2017, now Pat. No. 10,192,365, which is a continuation of application No. 14/711,763, filed on May 13, 2015, now Pat. No. 9,805,510.

Signed and Sealed this
Twentieth Day of February, 2024

Katherine Kelly Vidal
*Director of the United States Patent and Trademark Office*